(12) United States Patent
Cortes (10) Patent No.: US 12,377,592 B2
(45) Date of Patent: Aug. 5, 2025

(54) USE OF METALLOCENE BASED POLYPROPYLENE RANDOM COPOLYMERS IN BLOWN FILMS

(71) Applicant: FINA TECHNOLOGY, INC., Houston, TX (US)

(72) Inventor: Leonardo Cortes, League City, TX (US)

(73) Assignee: Fina Technology, Inc., Houston, TX (US)

( * ) Notice: Subject to any disclaimer, the term of this patent is extended or adjusted under 35 U.S.C. 154(b) by 419 days.

(21) Appl. No.: 15/350,550

(22) Filed: Nov. 14, 2016

(65) Prior Publication Data

US 2018/0133945 A1  May 17, 2018

(51) Int. Cl.
*B29C 48/00* (2019.01)
*B29C 48/08* (2019.01)
(Continued)

(52) U.S. Cl.
CPC ........ *B29C 48/022* (2019.02); *B29C 48/0018* (2019.02); *B29C 48/08* (2019.02); *B29C 48/10* (2019.02); *B29C 48/21* (2019.02); *B32B 27/08* (2013.01); *B32B 27/327* (2013.01); *B29K 2023/14* (2013.01); *B29K 2079/085* (2013.01); *B29K 2105/0005* (2013.01); *B29K 2105/0094* (2013.01); *B29K 2995/0022* (2013.01); *B29K 2995/0026* (2013.01);
(Continued)

(58) Field of Classification Search
CPC ......... B32B 27/18; B32B 27/32; B32B 27/08; B32B 27/22; B32B 7/04; B32B 27/327; B32B 2250/242; B32B 2439/70; B32B 2307/412; B32B 2307/54; B32B 2307/5825; B32B 2270/00; B32B 2439/06; B32B 2307/406; B32B 2250/03; B32B 2307/51; B32B 2250/02; B32B 2307/732; B32B 2439/46; B29C 48/10; B29C 48/08; B29C 48/0018; B29C 48/21; B29C 48/022; B29K 2023/14; B29K 2079/085; B29K 2995/0081; B29K 2105/0094; B29K 2995/0097; B29K 2105/0005; B29K 2995/0026; B29K 2995/0022; B29K 2995/0077; B29L 2031/7128

See application file for complete search history.

(56) References Cited

U.S. PATENT DOCUMENTS 5,643,847 A    7/1997   Walzer et al.
6,143,686 A   11/2000   Vizzini et al.
(Continued)

OTHER PUBLICATIONS

International Search Report and Written Opinion issued in Application No. PCT/US17/60886, dated Jan. 25, 2018, 7 pages.
(Continued)

*Primary Examiner* — Samir Shah
(74) *Attorney, Agent, or Firm* — Buchanan Ingersoll & Rooney PC (57) ABSTRACT

A method of making a film by coextruding a multi-layer structure comprising at least one skin layer comprising a metallocene-based polypropylene random copolymer. A coextruded multi-layer film comprising at least one skin layer comprising a metallocene-based polypropylene random copolymer, and a flexible package compromising such a coextruded multi-layer film are also provided.

13 Claims, 1 Drawing Sheet

(51) Int. Cl.
  *B29C 48/10* (2019.01)
  *B29C 48/21* (2019.01)
  *B32B 27/08* (2006.01)
  *B32B 27/32* (2006.01)
  *B29K 23/00* (2006.01)
  *B29K 79/00* (2006.01)
  *B29K 105/00* (2006.01)
  *B29L 31/00* (2006.01)

(52) U.S. Cl.
  CPC ............... *B29K 2995/0077* (2013.01); *B29K 2995/0081* (2013.01); *B29K 2995/0097* (2013.01); *B29L 2031/7128* (2013.01); *B32B 2307/406* (2013.01); *B32B 2307/412* (2013.01); *B32B 2307/54* (2013.01); *B32B 2307/5825* (2013.01); *B32B 2307/732* (2013.01); *B32B 2439/06* (2013.01)

(56) References Cited

U.S. PATENT DOCUMENTS

| | | |
|---|---|---|
| 6,228,795 B1 | 5/2001 | Vizzini |
| 9,184,358 B2 | 11/2015 | Jang et al. |
| 2002/0176974 A1 | 11/2002 | Hanyu et al. |
| 2004/0053066 A1* | 3/2004 | Cretekos ............... B32B 37/153 |
| | | 428/500 |
| 2006/0147663 A1 | 7/2006 | Barre et al. |
| 2008/0146762 A1 | 6/2008 | Mier et al. |
| 2009/0246491 A1 | 10/2009 | Cortes |
| 2011/0083796 A1* | 4/2011 | Sheppard ............... B32B 27/32 |
| | | 156/213 |
| 2012/0045656 A1 | 2/2012 | Radermacher et al. |
| 2012/0196102 A1 | 8/2012 | Cortes |
| 2014/0127489 A1 | 5/2014 | Pavlik |
| 2015/0258756 A1* | 9/2015 | Lu ......................... B32B 27/327 |
| | | 428/213 |

OTHER PUBLICATIONS

Eugene Yozi-Xian Chen & Tobin J. Marks, Cocatalysts for Metal-Catalyzed Olefin Polymerization: Activators, Activation Processes; and Structure-Activity Relationships 100(4) Chemical Reviews 1391-1434 (2000).

Gregory G. Hlatky, Heterogeneous Single-Site Catalysts for Olefin Polymerization 100(4) Chemical Reviews 1347-1374 (2000).

* cited by examiner

USE OF METALLOCENE BASED POLYPROPYLENE RANDOM COPOLYMERS IN BLOWN FILMS

FIELD

The present disclosure relates generally to films containing polypropylene; more particularly, the present disclosure relates to films comprising at least one skin layer comprising a metallocene-based polypropylene random copolymer.

BACKGROUND

The film market demands resins that can provide a variety of film properties. Various applications give rise to differing needs from a film, such as good physical and mechanical properties (e.g., high tear, stiffness, tensile strength, dart impact resistance, and heat resistance, low seal initiation temperature, and the ability to seal-through contamination), and/or good optical properties (e.g., high clarity and gloss). The features of polyethylene (PE) and polypropylene (PP) semi-crystalline polymers are such that they cover a wide range of properties and potential applications.

Among the different possible ways to convert polymers into films, the blown film process with air-cooling is economical and widely used. This is because films obtained by blowing have a tubular shape which makes them particularly advantageous in the production of bags for a wide variety of uses (e.g., bags for urban refuse, bags used in the storage of industrial materials, for frozen foods, carrier bags, etc.). The tubular structure may enable the number of welding joints used for formation of the bag to be reduced when compared with the use of flat films, with consequent simplification of the process. Although cast films can be processed to achieve biaxial orientation, blown films are generally preferred as they generally utilize less subsequent processing steps to achieve good mechanical properties, namely tensile strength, elastic modulus, and impact resistance, in both the machine and transverse directions. Moreover, the versatility of the blown film technique makes it possible, simply by varying the air-insufflation parameters, to obtain tubular films of various sizes, therefore avoiding having to trim the films down to the appropriate size as is typical in the technique of extrusion through a flat head. For blown film applications, the resin should also provide good bubble stability and suitable melt flow rate for efficient film formation. Bubble instability in blown film extrusion creates problems that may vary from a fluctuating film gauge and width to scratches and tears, for example. Tailoring the properties of films, via, for example, altering the polyolefin(s) employed, to fit a desired application is constantly ongoing.

To date, the application of polypropylene for blown film technology has been restricted to niche applications or technologies, such as a polypropylene blown film process with water contact cooling ring for highly transparent packaging film, and polypropylene used as a sealing or temperature resistance layer in multilayer structures. Blown film producers are showing more interest in developing new structures with polypropylene, as polypropylene may offer some advantages (e.g., heat resistance, puncture resistance, downgauge) compared to polyethylene. Impact copolymers (or heterophasic copolymers) with low melt flow rate have high melt strength and good mechanical properties that may enable blown extrusion, with good bubble stability, in monolayer structures or core layers.

Accordingly, an ongoing need exists for methods of providing films having desired mechanical, optical, and/or processing characteristics, and for films, including blown films, produced via such methods.

SUMMARY

Disclosed herein is a method of making a film that includes coextruding a multi-layer structure with at least one skin layer that includes a metallocene-based polypropylene random copolymer. The multi-layer structure can include a first and second skin layer. The film can be produced using a blown film extrusion process or optionally a cast film extrusion process and optionally the film is an oriented film. The at least one skin layer can include a blend of the metallocene-based polypropylene random copolymer with at least one other polymer selected from the group of low density polyethylenes, linear low density polyethylenes, high density polyethylenes, ethylene copolymers, polypropylene homopolymers, polypropylene random copolymers, polypropylene impact copolymers, polybutenes, terpolymers, and combinations thereof. The at least one skin layer can further include at least one additive such as slip additives, antiblock additives, pigments, antioxidants, anti-static additives, surface modifiers, rheology modifiers, nucleators, clarifiers, processing aids, and combinations thereof. In an embodiment the at least one skin layer can be at least 5% of the total thickness of the film. In an embodiment the metallocene-based polypropylene has a melting point in the range of from about 100° C. to about 160° C. In an embodiment the metallocene-based polypropylene has an ethylene content in the range of from about 0 wt % to about 8 wt %. In an embodiment the metallocene-based polypropylene has a melt flow rate (MFR) in the range of from about 0.1 g/10 min to about 40 g/10 min. In an embodiment the film has a total thickness in the range of from about 0.1 mil (2.5 µm) to about 30 mil (750 µm). In an embodiment the film has a haze of less than 10% and a gloss of greater than 60. In an embodiment the film has a haze of less than 15% and a gloss of greater than 50. In an embodiment the film has a tensile strength at yield of greater than 2400 psi and a secant modulus of greater than 50 kpsi. In an embodiment the film has a tensile strength at yield of greater than 2800 psi and a secant modulus of greater than 75 kpsi. In an embodiment the film has a haze of less than 15%, a gloss of greater than 50, an Elmendorf Tear in the machine direction of at least 300 g, an Elmendorf Tear in the transverse direction of at least 1000 g, a tensile strength at yield of greater than 2400 psi, a secant modulus of greater than 50 kpsi, and a seal initiation temperature @ 0.77 N/cm, of less than 104° C.

Disclosed herein is a coextruded multi-layer film having at least one skin layer, wherein the at least one skin layer includes a metallocene-based polypropylene random copolymer. In an embodiment a flexible package is made from the coextruded multi-layer film. In an embodiment the film has a haze of less than 10% and a gloss of greater than 60. In an embodiment the film has a haze of less than 15% and a gloss of greater than 50. In an embodiment the film has a tensile strength at yield of greater than 2400 psi and a secant modulus of greater than 50 kpsi. In an embodiment the film has a tensile strength at yield of greater than 2800 psi and a secant modulus of greater than 75 kpsi. In an embodiment the film has a haze of less than 10%, a gloss of greater than 60, a tensile strength at yield of greater than 2800 psi and a secant modulus of greater than 75 kpsi. In an embodiment the film has a haze of less than 15%, a gloss of greater than 50, an Elmendorf Tear in the machine direction of at least 300 g, an Elmendorf Tear in the transverse direction of at least 1000 g, a tensile strength at yield of greater than 2400 psi, a secant modulus of greater than 50 kpsi, and a seal initiation temperature @ 0.77 N/cm, of less than 104° C.

BRIEF DESCRIPTION OF THE DRAWING

The following figure is included to illustrate certain aspects of the present disclosure, and should not be viewed as providing exclusive embodiments. The subject matter disclosed herein is capable of considerable modification, alteration, and equivalents in form and function, as will occur to one having ordinary skill in the art and having the benefit of this disclosure.

DETAILED DESCRIPTION

It has been discovered that metallocene-based polypropylene (mPP), such as metallocene-based polypropylene random copolymers (mRCPs), can be used in films, such as blown films. (As utilized herein, the phrase, 'metallocene-based polypropylene' or 'mPP' is meant to encompass metallocene-catalyzed polypropylene, including polypropylene homopolymers and polypropylene random copolymers.) The incorporation of metallocene-based polypropylene random copolymers has been found to be particularly desirable when utilized to form skin layers in coextruded structures. The features and advantages provided by the films of this disclosure will be readily apparent to those skilled in the art upon a reading of the following description of the embodiments. Of the many advantages of the present disclosure, only a few of which are discussed or alluded to herein, the use of mRCPs in skin layer(s) according to the present disclosure may provide significant benefits to films, including, without limitation, PE-based structures. Potential benefits include, but are not limited to, high stiffness, high tensile strength, low seal initiation temperature (SIT), high seal strength, and/or relatively good optics (haze and/or gloss), and/or toughness (tear and/or impact resistance). According to this disclosure, the mRCP(s) in the skin layer(s) can be tailored to obtain desired properties in the film.

Herein disclosed is a method of making a film, and a film produced via the method, the method comprising: coextruding a multi-layer structure comprising at least one skin layer, wherein the at least one skin layer comprises a metallocene-based polypropylene random copolymer.

Metallocene Catalyst System

The metallocene catalyst system via which the mPP of the herein disclosed films and methods is formed may be characterized as a supported catalyst system, or an unsupported catalyst system, sometimes also referred to as a homogeneous (soluble in hydrocarbons) catalyst. A brief discussion of suitable catalyst systems is included below, but is not intended to limit the scope of this disclosure to such catalysts.

Metallocenes may include organometallic compounds containing two cyclopentadienyl rings bonded to a metal atom. Metallocene catalysts generally include a transition metal situated between to organic rings. Metallocene catalysts may be characterized generally as coordination compounds incorporating one or more cyclopentadienyl (Cp) groups (which may be substituted or unsubstituted, each substitution being the same or different) coordinated with a transition metal through π bonding. The substituent groups on the Cp groups may be linear, branched or cyclic hydrocarbyl radicals. The cyclic hydrocarbyl radicals may further form other contiguous ring structures, including, for example, indenyl, azulenyl and fluorenyl groups. These contiguous ring structures may further be substituted or unsubstituted by hydrocarbyl radicals, such as C1 to C20 hydrocarbyl radicals.

A specific example of a metallocene catalyst is a bulky ligand metallocene compound generally represented by the formula:

$$[L]_m M[A]_n; \qquad (1)$$

where L is a bulky ligand, A is a leaving group, M is a transition metal, and m and n are such that the total ligand valency corresponds to the transition metal valency. For example, m may be from 1 to 3, and n may be from 1 to 3.

The metal atom "M" of the metallocene catalyst compound may be selected from Groups 3 through 12 atoms and lanthanide Group atoms in one embodiment, selected from Groups 3 through 10 atoms in a more particular embodiment, selected from Sc, Ti, Zr, Hf, V, Nb, Ta, Mn, Re, Fe, Ru, Os, Co, Rh, Ir, and Ni in yet a more particular embodiment, selected from Groups 4, 5 and 6 atoms in yet a more particular embodiment, Ti, Zr, Hf atoms in yet a more particular embodiment, and Zr in yet a more particular embodiment. The oxidation state of the metal atom "M" may range from 0 to +7 in one embodiment, in a more particular embodiment, is +1, +2, +3, +4 or +5, and in yet a more particular embodiment is +2, +3 or +4. The groups bound to the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound." The Cp ligands are distinct from the leaving groups bound to the catalyst compound in that they are not highly susceptible to substitution/abstraction reactions.

Cp typically includes fused ring(s) or ring systems. The ring(s) or ring system(s) typically include atoms selected from Group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include 2-methyl, 4phenyl indenyl; cyclopentadienyl; cyclopentaphenanthreneyl; indenyl; benzindenyl; fluorenyl; tetrahydroindenyl; octahydrofluorenyl; cyclooctatetraenyl; cyclopentacyclododecene; phenanthrindenyl; 3,4-benzofluorenyl; 9-phenylfluorenyl; 8-H-cyclopent[a]acenaphthylenyl; 7-H-dibenzofluorenyl; indeno[1,2-9]anthrene; thiophenoindenyl; thiophenofluorenyl; hydrogenated versions thereof (e.g., 4,5,6,7-tetrahydroindenyl or H4Ind); substituted versions thereof; and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkyl amidos, alkoxycarbonyls, aryloxycarbonyls, carbomoyls, alkyl- and dialkyl-carbamoyls, acyloxys, acylaminos, aroylaminos and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups, and the like, including all isomers thereof, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsityl, and the like, halocarbyl-substituted organometalloid radicals including tris(trifluoromethyl)silyl, methylbis (difluoromethyl)silyl, bromomethyldimethylgermyl, and the like, disubstituted boron radicals including dimethylboron for example, disubstituted Group 15 radicals including dimethylamine, dimethylphosphine, diphenyl amine, methylphenylphosphine, and Group 16 radicals including methoxy, ethoxy, propoxy, phenoxy, methylsulfide and ethylsulfide. Other substituents R include olefins, such as but not limited to, olefinically unsaturated substituents including vinyl-terminated ligands, for example 3-butenyl, 2-propenyl, 5-hexenyl, and the like. In one embodiment, at least two R groups, two adjacent R groups in one embodiment, are joined to form a ring structure having from 3 to 30 atoms selected from carbon, nitrogen, oxygen, phosphorous, silicon, germanium, aluminum, boron and combinations thereof. Also, a substituent group R group such as 1-butanyl, may form a bonding association to the element M.

Each anionic leaving group may be independently selected, and may include any leaving group, such as halogen ions, hydrides, C1 to C12 alkyls, C2 to C12 alkenyls, C6 to C12 aryls, C7 to C20 alkylaryls, C1 to C12 alkoxys, C6 to C16 aryloxys, C7 to C18 alkylaryloxys, C1 to C12 fluoroalkyls, C6 to C12 fluoroaryls, C1 to C12 heteroatom-containing hydrocarbons and substituted derivatives thereof, hydride, halogen ions, C1 to C6 alkylcarboxylates, C1 to C6 fluorinated alkylcarboxylates, C6 to C12 arylcarboxylates, C7 to C18 alkylarylcarboxylates, C1 to C6 fluoroalkyls, C2 to C6 fluoroalkenyls and C7 to C18 fluoroalkylaryls in yet a more particular embodiment, hydride, chloride, fluoride, methyl, phenyl, phenoxy, benzoxy, tosyl, fluoromethyls and fluorophenyls in yet a more particular embodiment, C1 to C12 alkyls, C2 to C12 alkenyls, C6 to C12 aryls, C7 to C20 alkylaryls, substituted C1 to C12 alkyls, substituted C6 to C12 aryls, substituted C7 to C20 alkylaryls, C1 to C12 heteroatom-containing alkyls, C1 to C12 15 heteroatom-containing aryls and C1 to C12 heteroatom-containing alkylaryls in yet a more particular embodiment, chloride, fluoride, C1 to C6 alkyls, C2 to C6 alkenyls, C7 to C18 alkylaryls, halogenated C1 to C6 alkyls, halogenated C2 to C6 alkenyls and halogenated C7 to C18 alkylaryls in yet a more particular embodiment, fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment, and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O$—), hydrides, halogen ions, and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals, and the like. In one embodiment, two or more leaving groups form a part of a fused ring or ring system.

L and A may be bridged to one another. A bridged metallocene, for example may, be described by the general formula:

$$XCp^A Cp^B MA_n;\qquad(2)$$

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as, but not limited to, at least one of a carbon, oxygen, nitrogen, silicon, aluminum, boron, germanium, tin, and combinations thereof wherein the heteroatom may also be C1 to C12 alkyl or aryl substituted to satisfy neutral valency. The bridging group may also contain substituent groups as defined above, including halogen radicals and iron. More particular non-limiting examples of bridging groups are represented by C1 to C6 alkylenes, substituted C1 to C6 alkylenes, oxygen, sulfur, $R_2C=$, $R_2Si=$, $—Si(R)_2Si(R_2)—$ and $R_2G=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms and halogen radicals and wherein two or more Rs may be joined to form a ring or ring system. In embodiments, the bridged metallocene catalyst component has two or more bridging groups (X).

As used herein, the term "metallocene activator" is defined to be any compound or combination of compounds, supported or unsupported, which may activate a single-site catalyst compound (e.g., metallocenes, Group 15 containing catalysts, etc.). Typically, this involves the abstraction of at least one leaving group (A group in the formulas/structures above, for example) from the metal center of the catalyst component. The catalyst components may be activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, Lewis acids such as alumoxane (e.g., "MAO"), modified alumoxane (e.g., "TIBAO") and alkylaluminum compounds may be used as activators, to activate desirable metallocenes described herein. MAO and other aluminum-based activators are well known in the art. Non-limiting examples of aluminum alkyl compounds which may be utilized as activators for the catalysts described herein include trimethylaluminum, triethylaluminum, triisobutylaluminum, tri-n-hexylaluminum, tri-n-octylaluminum, and the like.

Ionizing activators are well known in the art and are described by, for example, Eugene Yozi-Xian Chen & Tobin J. Marks, Cocatalysts for Metal-Catalyzed Olefin Polymerization: Activators, Activation Processes; and Structure-Activity Relationships 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., tri(n-butyl)

ammonium tet-rakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms, aryl groups having 3 to 20 carbon atoms (including substituted aryls) and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

The activators may or may not be associated with or bound to a support, either in association with the catalyst component (e.g., metallocene) or separate from the catalyst component, such as described by Gregory G. Hlatky, Heterogeneous Single-Site Catalysts for Olefin Polymerization 100(4) CHEMICAL REVIEWS 1347-1374 (2000).

As noted hereinabove, the metallocene catalyst may be supported or unsupported. Typical support materials may include, without limitation, talc, inorganic oxides, clays and clay minerals, ion-exchanged layered compounds, diatomaceous earth compounds, zeolites or a resinous support material, such as a polyolefin. Specific inorganic oxides include, but are not limited to, silica, alumina, magnesia, titania and zirconia, for example. The inorganic oxides used as support materials may have an average particle size of from 30 microns to 600 microns or from 30 microns to 100 microns, a surface area of from 50 $m^2/g$ to 1,000 $m^2/g$ or from 100 $m^2/g$ to 400 $m^2/g$ and/or a pore volume of from 0.5 cc/g to 3.5 cc/g or from 0.5 cc/g to 2 cc/g. Desirable methods for supporting metallocene ionic catalysts are described in U.S. Pat. Nos. 5,643,847; 9,184,358 and 9,184,389, which are incorporated by reference herein.

Metallocene-Based Polypropylene

The mPPs of this disclosure may be produced via any suitable polymerization process(es) carried out over the desired polymerization catalyst(s), as known to those of skill in the art. The equipment, process conditions, reactants, additives and any other materials that may be used in the polymerization process(es) can vary depending on the desired composition and properties of the metallocene-based polymer being formed. As known to those of ordinary skill in the art, the polymerization processes may include solution phase, gas phase, slurry phase, bulk phase, high pressure processes or any combinations thereof.

In embodiments, the mRCP of the at least one skin layer comprises a metallocene-based homopolymer, comprising 100% polypropylene. In embodiments, the mRCP of the at least one skin layer comprises a copolymer of propylene and an olefin monomer of from 2 to 10 carbon atoms. In embodiments, the mRCP is a copolymer of propylene and ethylene. In embodiments, the mRCP has an ethylene content in the range of from about 0 wt % to about 8 wt %, from about 0 wt % to about 5 wt %, or from about 0 wt % to about 3 wt %. According to this disclosure, the mRCP(s) of the at least one skin layer may be tailored to provide desired properties in the film. For example, as discussed further in the Examples hereinbelow, a higher ethylene content (i.e., a lower melting point) mRCP may provide a film having enhanced tear strength (MD and TD) and optics and/or a lower seal initiation temperature, while a lower ethylene content (i.e., a higher melting point) mRCP may provide a film having enhanced stiffness (i.e., secant modulus) and tensile strength.

In embodiments, the mRCP is isotactic. In embodiments, the metallocene-based polypropylene has a melting point in the range of from about 100° C. to about 160° C., from about 120° C. to about 153° C., or from about 120° C. to about 148° C. In embodiments, the mRCP has a melting point of less than or equal to about 115° C., 120° C., 130° C., 140° C., 150° C., 158° C., or 160° C. In embodiments, the metallocene-based polypropylene is an mRCP having a melting point in the range of from about 100° C. to about 160° C., from about 120° C. to about 153° C., or from about 120° C. to about 148° C. In embodiments, the mRCP has a melting point of less than or equal to about 115° C., 120° C., 130° C., 140° C., 150° C., 158° C., or 160° C.

In embodiments, the mRCP has a polydispersity in the range of from about 2.0 to about 6.5, from about 2.0 to about 5.5, or from about 2.0 to about 4.0. In embodiments, the mRCP has a polydispersity in the range of from about 2.0 to about 6.5, from about 2.0 to about 5.5, or from about 2.0 to about 4.0. In embodiments, the mRCP has a polydispersity of less than 6.5, 5.0, or 4.0. In embodiments, the mRCP has a polydispersity of less than 6.5, 5.0, or 4.0.

In embodiments, the mRCP has a melt flow rate (MFR) in the range of from about 0.1 g/10 min to about 40 g/10 min, from about 1 g/10 min to about 24 g/10 min, or from about 2 g/10 min to about 15 g/10 min. In embodiments, the mRCP has a MFR of less than or equal to about 15, 14, 13, 12, 11, or 10 g/10 min. In embodiments, the mRCP is a homopolymer having an MFR in the range of from about 0.1 g/10 min to about 40 g/10 min, from about 1 g/10 min to about 24 g/10 min, or from about 2 g/10 min to about 15 g/10 min. In embodiments, the mRCP is a homopolymer having an MFR of less than or equal to about 15, 14, 13, 12, 11, or 10 g/10 min. In embodiments, the mRCP has an MFR in the range of from about 0.1 g/10 min to about 40 g/10 min, from about 1 g/10 min to about 24 g/10 min, or from about 2 g/10 min to about 15 g/10 min. In embodiments, the mRCP has an MFR of less than or equal to about 15, 14, 13, 12, 11, or 10 g/10 min.

Skin Layer

As discussed hereinabove, the at least one skin layer comprises a metallocene-based polypropylene random copolymer. In embodiments, the at least one skin layer comprises a blend of the metallocene-based polypropylene random copolymer with at least one other polymer including, but not limited to, low density polyethylenes, linear low density polyethylenes, high density polyethylenes, ethylene copolymers, polypropylene homopolymers, polypropylene random copolymers, polypropylene impact copolymers, polybutenes, and/or terpolymers. As utilized herein, the term low density polyethylene' refers to a ethylene polymer produced in a high-pressure process (e.g., tubular or autoclave) with a typical density from about 0.910 g/cc up to about 0.940 g/cc. As utilized herein, the term 'linear low density polyethylenes' refers to copolymers of ethylene and other alpha-olefins having 3 to 10 carbon atoms having a typical density from about 0.900 g/cc to about 0.935 g/cc. As utilized herein, the term 'high density polyethylenes' refers to ethylene homopolymers and copolymers of ethylene and other alpha-olefins having 3 to 10 carbon atoms having a typical density from about 0.935 g/cc to about 0.970 g/cc. As utilized herein, the term 'ethylene copolymer' refers to a copolymer of ethylene with one or more additional monomers. As utilized herein, the term 'polypropylene impact copolymers' refers to a heterophasic copolymer based on a polypropylene homopolymer or copolymer matrix and a alpha-olefins copolymer such as an ethylene-propylene copolymer. As utilized herein, the term 'polybutenes' refers to polymers or copolymers of olefins containing four carbons. As utilized herein, the term 'terpolymer' refers to a polymer produced utilizing at least three monomers. For example, the term terpolymer can refer to a polymer of propylene, ethylene and butene. The at least one other polymer may or may not be metallocene-based. For example, in embodiments, the at least one other polymer of the at least one skin layer may be formed via Ziegler-Natta or other suitable catalyst, rather than a metallocene catalyst system. In embodiments, the skin layer comprises from about 1 wt % to about 100 wt %, from about 10 wt % to about 100 wt %, or from about 25 wt % to about 100 wt % of the mRCP, and from about 0 wt % to about 99 wt %, from about 0 wt % to about 90 wt %, or from about 0 wt % to about 75 wt % of the at least one other polymer.

In embodiments, the skin layer comprises a blend of at least one mRCP and at least one metallocene-based polypropylene homopolymer. In embodiments, the skin layer comprises from about 1 wt % to about 99 wt %, from about 10 wt % to about 90 wt %, or from about 20 wt % to about 80 wt % of the at least one mRCP, and from about 1 wt % to about 99 wt %, from about 10 wt % to about 90 wt %, or from about 20 wt % to about 80 wt % of the at least one metallocene-based polypropylene homopolymer. In embodiments, the skin layer comprises about 50 wt % of the at least one mRCP, and about 50 wt % of the at least one metallocene-based homopolymer.

In embodiments, the at least one metallocene-based homopolymer in the blend of the at least one mRCP and the at least one metallocene-based polypropylene homopolymer has a polydispersity in the range of from about 2.0 to about 6.5, from about 2.0 to about 5.5, or from about 2.0 to about 4.0; or less than or equal to 6.5, 5.0, or 4.0. In embodiments, the at least one metallocene-based homopolymer in the blend of the at least one mRCP and the at least one metallocene-based polypropylene homopolymer has an MFR in the range of from about 0.1 g/10 min to about 40 g/10 min, from about 1 g/10 min to about 24 g/10 min, or from about 2 g/10 min to about 15 g/10 min; or less than or equal to about 40, 24, or 15 g/10 min.

In embodiments, the skin layer comprises a blend of a low melting point mRCP and a low MFR clarified metallocene homopolymer. A coextruded blown film comprising such a skin layer may provide significant improvement of haze and gloss, as noted in Example 2 hereinbelow. As utilized herein, a low melting point refers to a melting point less than or equal to about 135° C. As utilized herein, a low MFR refers to an MFR of less than or equal to about 5 g/10 minutes.

Other Additives

The skin layer may further comprise suitable amount(s) of one or more additives capable of imparting specific properties to the articles the resins are intended to produce, as known to those of skill in the art. Such additives include, but are not limited to, slip additives, antiblock additives, pigments, antioxidants, anti-static additives, surface modifiers, rheology modifiers, nucleators, clarifiers, processing aids, fillers such as, without limitation, talc and calcium carbonate, stabilizers, anti-corrosion agents, UV stabilizing agents, plasticizers, heat stabilizers, ultraviolet absorbers, antimicrobial agents, lubricants, other resins, and the like.

Coextruded Multi-layer Film

Also disclosed herein is a coextruded multi-layer film compromising the at least one skin layer disclosed hereinabove, the at least one skin layer of the coextruded multi-layer film comprising a metallocene-based polypropylene random copolymer. The herein-disclosed film may be produced via the method(s) provided hereinabove. The mRCP-containing skin layer of this disclosure may be useful in a variety of end-use applications. In embodiments, the mRCP is used to form a skin layer of a blown film. Thus, in embodiments, the film comprising the herein-disclosed skin layer(s) is produced using a blown film extrusion process. The blown film may be produced using any method known to those of ordinary skill in the art. In embodiments, the film is produced using a cast film extrusion process. In embodiments, the film is an oriented film. In embodiments, the film is a biaxially-oriented film. In embodiments, the film is a uniaxially-oriented film.

As noted hereinabove, the mRCP polymers of the skin layer(s) herein may be co-extruded with other resins to form multilayer films or sheet materials. The co-extrusion may be conducted according to methods well known in the art. For example, co-extrusion may be carried out by simultaneously pushing the polymer(s) of the at least one skin layer and polymer(s) of a core layer through a slotted or spiral die system to form a film formed of an outer layer of the skin polymer and substrate layer of the core polymer. Furthermore, the film or sheet materials may be laminated with other materials (i.e., a second sheet or film material) after extrusion as well, thus providing a laminated article. Again, known techniques in laminating sheets and films may be applied to form these laminates.

In embodiments, the film comprises first and second skin layers. In embodiments, the method comprises coextruding a multi-layer structure comprising a core layer and the at least one coextruded skin layer. Thus, in embodiments, the film further comprises a core. In embodiments, the film comprises first and second skin layers between which one or multiple core layers are sandwiched. Although there may be great variability in the thickness of the layers depending on the compositions thereof and the application for which the film is to be utilized, in embodiments, the first skin layer, the core layer(s), and the second skin layer may be present in a thickness ratio of about 5-30%:30-50%:5-30%. In embodiments, the first skin layer, the core layer(s), and the second skin layer are present in a thickness ratio of about 25:50:25%. The composition of the core layer is not particularly limited, although, in embodiments, the core layer comprises a C2-C8 polyolefin. The resin of the core layer may be produced via catalyst systems selected from metallocene catalyst systems, Ziegler-Natta catalyst systems, and other catalyst systems known to one skilled in the art for the production of polyolefins, for example. In embodiments, the core layer comprises polyethylene. In embodiments, the core layer comprises a metallocene-based polyethylene (mPE). In embodiments, the core layer comprises a metallocene-based polyethylene (mPE), and the at least one skin layer comprises an mRCP. The core layer may comprise additives, such as those mentioned above for the skin layer, as known to those of skill in the art. In embodiments, the film comprises the at least one skin layer and 2 or more total layers. In embodiments, the film comprises two skin layers, as disclosed herein, and 3 or more total layers.

As noted hereinabove, the thickness of the film, the skin layer(s), and the core layer can vary widely depending on the specific application, target properties, equipment, etc. However, without limitation, in embodiments, the skin layer compromises at least 5%, 10%, or 15% of the total thickness of the film. In embodiments, the core layer(s) comprises from about 10% to about 95%, from about 25% to about 90%, or from about 30% to about 85% of the total thickness of the film; the at least one skin layer may comprise from about 5% to about 35%, from about 5% to about 25%, or from about 5% to about 20% of the total thickness of the film. In embodiments, the film has a total thickness in the range of from about 0.1 mil (2.5 μm) to about 30 mil (750 μm), from about 0.2 mil (5 μm) to about 10 mil (250 μm), or from about 0.5 mil (12.5 μm) to about 8 mil (200 μm).

Film Properties

In embodiments, a film according to this disclosure exhibits ('good') optics characterized by a haze of from about 5% to about 25%, from about 11% to about 25%, or from about 12% to about 24%, less than or equal to about 25%, 20%, or 15%, or greater than or equal to about 10%-20% or an integer therebetween; a gloss in the range of from about 20 to about 70, from about 35 to about 65, or from about 35 to about 60, greater than, less than, or equal to about 35, 40, 50, 60, 65, 70, or 75; or a combination thereof. In an embodiment the film of this disclosure has a haze of less than 15% and a gloss of at least 50. In an embodiment the film of this disclosure has a haze of less than 10% and a gloss of at least 60.

In embodiments, a film according to this disclosure has a ('high') stiffness, as measured by 1% secant modulus, MD, in the range of about 45 kpsi to about 200 kpsi, from about 50 kpsi to 99 kpsi, from about 45 kpsi to about 100 kpsi, or less than or equal to 200 kpsi, 250 kpsi, 100 kpsi, 90 kpsi, or 80 kpsi. In embodiments, the skin layer comprises an mRCP having a melting point of less than or equal to about 120° C., 135° C., or 150° C.; and the film exhibits a stiffness as indicated by 1% secant modulus of at least 50 kpsi, 60 kpsi, 70 kpsi, or 75 kpsi, a tensile strength of at least 2400 psi, 2700 psi, 2800 psi, 2900 psi or 3000 psi, or both. In an embodiment the coextruded multi-layer film of this disclosure has a 1% secant modulus of at least 50 kpsi and a tensile strength of at least 2400 psi. In an embodiment the coextruded multi-layer film of this disclosure has a 1% secant modulus of at least 75 kpsi and a tensile strength of at least 2800 psi.

In an embodiment the coextruded multi-layer film of this disclosure has low haze/high gloss optical properties while also having high stiffness and strength. In an embodiment the coextruded multi-layer film has a haze of less than 15%, a gloss of at least 50, a 1% secant modulus of at least 50 kpsi and a tensile strength of at least 2400 psi. In an embodiment the coextruded multi-layer film has a haze of less than 10%, a gloss of at least 60, a 1% secant modulus of at least 75 kpsi and a tensile strength of at least 2800 psi.

In an embodiment the coextruded multi-layer film of this disclosure has a structure comprising mPE in the core layer and a blend of mRCP and mPP in the skins. The skins can range from a 25/75 weight percent blend to a 75/25 weight percent blend, optionally from a 35/65 weight percent blend to a 65/35 weight percent blend, optionally from a 40/60 weight percent blend to a 60/40 weight percent blend, optionally from a 45/55 weight percent blend to a 55/45 weight percent blend, optionally the skins can be a 50/50 weight percent blend of mRCP and mPP. In an embodiment the coextruded multi-layer film of this disclosure has a structure comprising mPE in the core and a blend of mRCP and mPP in the skins and exhibit low haze/high gloss optical properties while also having high stiffness and strength. In an embodiment the coextruded multi-layer film of this disclosure has a structure comprising mPE in the core and a blend of mRCP and mPP in the skins and has a haze of less than 15%, a gloss of at least 50, a 1% secant modulus of at least 50 kpsi and a tensile strength of at least 2400 psi. In an embodiment the coextruded multi-layer film of this disclosure has a structure comprising mPE in the core and a blend of mRCP and mPP in the skins and has a haze of less than 10%, a gloss of at least 60, a 1% secant modulus of at least 75 kpsi and a tensile strength of at least 2800 psi.

In embodiments, a film according to this disclosure exhibits a ('low') seal initiation temperature (SIT) at 0.77 N/cm of less than or equal to about 120° C., 117° C., 115° C., 110° C., 105° C., or less than or equal to about 104° C.; a seal initiation temperature (SIT) at 1.93 N/cm of less than or equal to 120° C., 117° C., 115° C., 110° C., 105° C., or less than or equal to about 104° C.; or both.

In embodiments, a film according to this disclosure exhibits a ('high') tensile strength, as measured by the tensile strength at yield in the machine direction, of greater than or equal to about 2100 psi, 2400 psi, 2700 psi, 2800 psi, 2900 psi, or 3000 psi.

In embodiments, a film according to this disclosure exhibits a ('high') toughness, as indicated by an Elmendorf tear in the machine direction ("MD Tear") of at least 100 g, 120 g, 130 g, 180 g, 200 g, 300 g, or 400 g; an Elmendorf tear in the transverse direction ("TD Tear") of at least 280 g, 300 g, 400 g, 500 g, 600 g, 800 g, 1000 g, 1200 g, 1400 g, or 1500 g; a falling dart impact resistance, of at least 80 g, 100 g, or 120 g; or a combination thereof for a 2 mil film. In embodiments, the skin layer comprises an mRCP having a melting point of greater than or equal to about 100° C., 110° C., or 120° C.; and the film exhibits a ('high') tear strength as indicated by an MD Tear of at least 200 g, 300 g, or 400 g, a TD Tear of at least 600 g, 700 g, or 800 g, or a combination thereof.

The films of the present disclosure can be used in any way known to be useful to those of ordinary skill in the art of using films. Also disclosed herein is a flexible package compromising the film of this disclosure. Such flexible packages include, without limitation, food packaging, heavy duty shipping sacks, primary and secondary packaging, protective packaging, standup pouches, shrink films, stretch films, etc. Articles that may be wrapped with the herein-disclosed films or sheets include, without limitation, frozen foods, other foods, urban refuse, fresh cut produce, detergent bags, towel overwrap, and the like.

The invention having been generally described, the following Examples are given as particular embodiments of this disclosure and to demonstrate the practice and advantages thereof. It is to be understood that the Examples are given by way of illustration only, and are not intended to limit the specification or the claims to follow in any manner.

EXAMPLES

Example 1

Coextruded Films Comprising Skins Containing One of a Variety of mRCPs

Film samples of 3-layer coextruded structures were formed. Comparative Film 1 (CF1) comprised mPE1 in the core, and the skins; Inventive Film 1 (IF1) comprised mPE1 in the core, and mRCP1 in the skins; Inventive Film 2 (IF2) comprised mPE1 in the core, and mRCP2 in the skins; Inventive Film 3 (IF3) comprised mPE1 in the core, and mRCP3 in the skins. Component mPE1 is a metallocene based medium density polyethylene with a density around 0.927 g/cc and a melt index (2.16 kg, 190° C.) around 0.9 g/10 min (LUMICENE® M2710EP film resin, commercially available from Total Petrochemicals & Refining USA, Inc.), mRCP1 is a metallocene based isotactic polypropylene random copolymer with a melting point around 140° C. (M7672 propylene copolymer produced by Total Petrochemicals USA, Inc.), mRCP2 is a metallocene based isotactic polypropylene random copolymer with a melting point around 119° C. (LX5 02-15 propylene copolymer, commercially available from Total Petrochemicals & Refining USA, Inc.), mRCP3 is a metallocene based isotactic polypropylene random copolymer with a melting point around 112° C. (LX5 07-21 propylene copolymer produced by Total Petrochemicals & Refining USA, Inc.), and mPP1 is a clarified metallocene based polypropylene homopolymer (M3282MZ propylene homopolymer produced by Total Petrochemicals & Refining USA, Inc.).

The melt flow rate and melting pointof the various polypropylene components utilized to produce the experimental films are provided in Table 1 hereinbelow. The films were produced on a Davis-Standard mini co-ex blown film line at a 2.5:1 BUR (blow-up ratio) and 2 mil (50 μm) gauge, with no stalk and a 25/50/25 layer distribution (i.e., each skin was 0.5 mil (12.5 μm) and the core was 1 mil (25 μm)).

TABLE 1

Materials

| Component | MFR, g/10 minutes | Melting Point, ° C. |
|---|---|---|
| mRCP1 | 14 | 140 |
| mRCP2 | 12 | 119 |
| mRCP3 | 11 | 112 |
| mPP1 | 2.3 | 153 |

A variety of film properties were determined, and are provided in Table 2. The haze (%) was determined according to ASTM method ASTM D1003; the 45° Gloss was determined according to ASTM D523; the Dart Impact Resistance (g) was determined according to ASTM D1709, A; the Elmendorf Tear (g) in the machine direction (MD) and the transverse direction (TD) were determined according to ASTM D1992; the 1% Secant Modulus (kpsi) in the machine direction was determined according to ASTM D882, A; the Tensile Strength at Yield (psi) in the machine direction was determined according to ASTM 882, A; the Seal Initiation Temperature (° C.) was determined under sealing conditions of 60 psi pressure and 1.0 seconds of dwell time.

TABLE 2

Film Properties of Coextruded Structures of Example 1

| Film | CF1 | IF1 | IF2 | IF3 | IF4 |
|---|---|---|---|---|---|
| Skins | mPE1 | mRCP1 | mRCP2 | mRCP3 | 50% mPP1 + 50% mRCP3 |
| Core | mPE1 | mPE1 | mPE1 | mPE1 | mPE1 |
| Haze, % (ASTM D1003) | 11 | 24 | 19 | 13 | 5.9 |
| Gloss, 45° (ASTM D523) | 58 | 38 | 37 | 54 | 76 |
| Dart Impact, g (ASTM D1709, A) | 260 | 95 | 150 | 149 | 87 |
| Elmendorf Tear, MD, g (ASTM D1992) | 384 | 133 | 184 | 417 | 97 |
| Elmendorf Tear, TD, g (ASTM D1992) | 802 | 287 | 684 | 1589 | 379 |
| Tear Ratio | 2.1 | 2.2 | 3.7 | 3.8 | 3.9 |
| 1% Secant Modulus, MD, kpsi (ASTM D882, A) | 45 | 99 | 72 | 58 | 89 |
| Tensile Strength at Yield, MD, psi (ASTM D882, A) | 2019 | 3267 | 2718 | 2468 | 3075 |
| SIT @ 0.77 N/cm, ° C. | 117.9 | — | 112.0 | 103.2 | — |
| SIT @ 1.93 N/cm, ° C. | 118.6 | — | 112.7 | 104.2 | — |

As apparent from the data in Table 2, there is a correlation between film properties and the mRCP utilized. The tear strength (both MD and TD), and optics are improved with a higher ethylene content mRCP (i.e., a lower melting point mRCP), while stiffness (as indicated by the 1% secant modulus) and tensile strength are higher for the lower ethylene content mRCPs (i.e., the higher melting point mRCPs).

Figure 1:
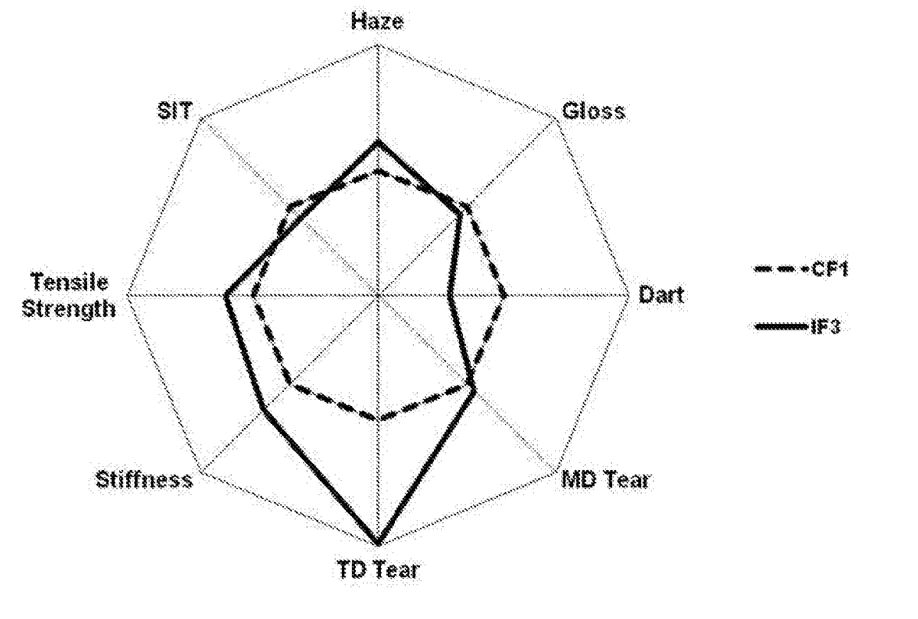
FIG. 1 depicts various properties of a film of this disclosure relative to those of a comparative film of Example 1.

Interestingly, IF3, comprising mRCP3, exhibited equivalent or superior tear values and similar optics relative to CF1, which contained mPE1 in both the core and skins. Moreover, as shown in Table 2, the seal initiation temperature (SIT) for IF3 is very low; thus it is expected that this film will exhibit high seal strength. The dart impact strength for IF3 is lower than that of CF1; however, it is sufficient for use in a number of applications. For reference, FIG. 1 shows a relative comparison of the coextruded structure of IF3 vs. the neat mPE1 CF1 film.

Example 2

Coextruded Films Comprising Skins Containing a Blend of mPPs

A structure comprising mPE1 in the core and a 50/50 weight percent blend of mRCP3 and mPP1 (a 2.0 MFR clarified metallocene PP homopolymer, as shown in Table 1) in the skins was made utilizing the same processing parameters provided in Example 1 hereinabove. This inventive film, IF4, exhibited outstanding optics (i.e., haze around 5% and gloss greater than 75) and provides a useful balance of stiffness and toughness.

The present disclosure is well adapted to attain the ends and advantages mentioned herein, as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

A: A method of making a film, the method comprising: coextruding a multi-layer structure comprising at least one skin layer, wherein the at least one skin layer comprises a metallocene-based polypropylene random copolymer.

B: A coextruded multi-layer film comprising: at least one skin layer, wherein the at least one skin layer comprises a metallocene-based polypropylene random copolymer.

C: A flexible package comprising: a multi-layer structure comprising at least one skin layer, wherein the at least one skin layer comprises a metallocene-based polypropylene random copolymer.

Each of embodiments A, B, and C may have one or more of the following additional elements: Element 1: wherein the multi-layer structure comprises first and second skin layers. Element 2: wherein the the film is produced using a blown film extrusion process. Element 3: wherein the film is produced using a cast film extrusion process. Element 4: wherein the wherein the film is an oriented film. Element 5: wherein the at least one skin layer comprises a blend of the metallocene-based polypropylene random copolymer with at least one other polymer selected from the group consisting of low density polyethylenes, linear low density polyethylenes, high density polyethylenes, ethylene copolymers, polypropylene homopolymers, polypropylene random copolymers, polypropylene impact copolymers, polybutenes, terpolymers, and combinations thereof. Element 6: wherein the at least one skin layer further comprises at least one additive selected from the group consisting of slip additives, anti-block additives, pigments, antioxidants, anti-static additives, surface modifiers, rheology modifiers, nucleators, clarifiers, processing aids, and combinations thereof. Element 7: wherein the at least one skin layer compromises at least 5% of the total thickness of the film. Element 8: wherein the metallocene-based polypropylene random copolymer has a melting point in the range of from about 100° C. to about 160° C. Element 9: wherein the metallocene-based polypropylene random copolymer has an ethylene content in the range of from about 0 wt % to about 8 wt %. Element 10: wherein the metallocene-based polypropylene random copolymer has a melt flow rate (MFR) in the range of from about 0.1 g/10 min to about 40 g/10 min. Element 11: wherein the film has a total thickness in the range of from about 0.1 mil (2.5 μm) to about 30 mil (750 μm). Element 12: wherein the film has a haze of less than 10%, a gloss of greater than 60, a tensile strength at yield of greater than 2800 psi, and a secant modulus of greater than 75 kpsi. Element 13: wherein the film has a haze of less than 15%, a gloss of greater than 50, an Elmendorf Tear in the machine direction of at least 300 g, an Elmendorf Tear in the transverse direction of at least 1000 g, a tensile strength at yield of greater than 2400 psi, a secant modulus of greater than 50 kpsi, and a seal initiation temperature @ 0.77 N/cm, of less than 104° C. Element 14: wherein the film has a tensile strength at yield of greater than 2400 psi and a secant modulus of greater than 50 kpsi.

While embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A coextruded multi-layer blown film comprising:
   a core layer, wherein the core layer comprises a metallocene polyethylene polymer;
   and at least one first skin layer, wherein the at least one first skin layer comprises an isotactic metallocene-based polypropylene random copolymer, and at least one second skin layer, wherein the at least one second skin layer comprises a blend of the isotactic metallocene-based polypropylene random copolymer with at least one other polymer formed via Ziegler-Natta catalyst, selected from the group consisting of low density polyethylenes, high density polyethylenes, ethylene copolymers, polypropylene homopolymers, polypropylene random copolymers, polybutenes, terpolymers, and combinations thereof, wherein the isotactic metallocene-based polypropylene random copolymer comprises a melting temperature less than or equal to 140° C., and
   wherein the co-extruded multi-layer blown film has a haze of less than 15%, a gloss of greater than 50, an Elmendorf tear in the machine direction of at least 300 g, an Elmendorf tear in the transverse direction of at least 1000 g, a tensile strength at yield in the machine direction of greater than 3075 psi, a secant modulus of greater than 50 kpsi, and a seal initiation temperature @0.77 N/cm, of less than 104° C.

2. A flexible package comprising the coextruded multi-layer blown film of claim 1.

3. The coextruded multi-layer blown film of claim 1, wherein the coextruded multi-layer blown film has a tensile strength at yield of greater than 2400 psi and a secant modulus of greater than 50 kpsi.

4. The coextruded multi-layer blown film of claim 1, wherein the coextruded multi-layer blown film has a haze of less than 10%, a gloss of greater than 60, and a secant modulus of greater than 75 kpsi.

5. The coextruded multi-layer blown film of claim 1, wherein the coextruded multi-layer blown film comprises the core layer disposed between the at least one first skin layer and the at least one second skin layer, wherein the at least one second skin layer comprises a metallocene-based polypropylene random copolymer.

6. The coextruded multi-layer blown film of claim 1, wherein the coextruded multi-layer blown film is an oriented film.

7. The coextruded multi-layer blown film of claim 1, wherein the at least one first skin layer further comprises at least one additive selected from the group consisting of slip additives, antiblock additives, pigments, antioxidants, antistatic additives, surface modifiers, rheology modifiers, nucleators, clarifiers, processing aids, and combinations thereof.

8. The coextruded multi-layer blown film of claim 1, wherein the at least one first skin layer comprises at least 5% of the total thickness of the film.

9. The coextruded multi-layer blown film of claim 1, wherein the isotactic metallocene-based polypropylene random copolymer has an ethylene content in the range of from about 0 wt % to about 8 wt %.

10. The coextruded multi-layer blown film of claim 1, wherein the isotactic metallocene-based polypropylene random copolymer has a melt flow rate (MFR) in the range of from about 0.1 g/10 min to about 40 g/10 min.

11. The coextruded multi-layer blown film of claim 1, wherein the coextruded multi-layer blown film has a total thickness in the range of from about 0.1 mil (2.5 µm) to about 30 mil (750 µm).

12. The coextruded multi-layer blown film of claim 1, wherein the at least one first skin layer comprises a blend of the isotactic metallocene-based polypropylene random copolymer and a metallocene polypropylene homopolymer.

13. The coextruded multi-layer blown film of claim 1, wherein the at least one second skin layer comprises a blend of the isotactic metallocene-based polypropylene random copolymer and a metallocene polypropylene homopolymers, and wherein the core layer is disposed between the at least one first skin layer and the at least one second skin layer.

* * * * *